(12) United States Patent
Ohiwa et al.

(10) Patent No.: US 10,954,655 B2
(45) Date of Patent: Mar. 23, 2021

(54) WORK VEHICLE AND METHOD FOR CONTROLLING WORK VEHICLE

(71) Applicant: KOMATSU LTD., Tokyo (JP)

(72) Inventors: Kenji Ohiwa, Tokyo (JP); Masao Yamamura, Tokyo (JP); Tomohiro Nakagawa, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 16/060,111

(22) PCT Filed: Nov. 29, 2016

(86) PCT No.: PCT/JP2016/085345
§ 371 (c)(1),
(2) Date: Jun. 7, 2018

(87) PCT Pub. No.: WO2017/110380
PCT Pub. Date: Jun. 29, 2017

(65) Prior Publication Data
US 2018/0355586 A1    Dec. 13, 2018

(30) Foreign Application Priority Data

Dec. 25, 2015   (JP) .............................. JP2015-253702

(51) Int. Cl.
*E02F 9/26* (2006.01)
*E02F 9/20* (2006.01)

(52) U.S. Cl.
CPC .............. *E02F 9/26* (2013.01); *E02F 9/2004* (2013.01)

(58) Field of Classification Search
None
See application file for complete search history.

(56) References Cited

U.S. PATENT DOCUMENTS 7,113,105 B2 *   9/2006  Sahm ........................ E02F 9/26
                                                    172/4.5
2006/0200283 A1  9/2006  Furuno et al.
2007/0168101 A1  7/2007  Shibamori et al.
2013/0103247 A1  4/2013  Ogawa et al.
(Continued)

FOREIGN PATENT DOCUMENTS

CN    102947513 A       2/2013
CN    103906879 A   *   7/2014   ............. G01S 19/43
(Continued)

*Primary Examiner* — Redhwan K Mawari
*Assistant Examiner* — Melanie J Patrick
(74) *Attorney, Agent, or Firm* — Faegre Drinker Biddle & Reath LLP

(57) ABSTRACT

A work vehicle includes a work implement, a main body, a bucket position detector, a display device, and a display controller. The work implement has a bucket. To the main body, the work implement is attached, and the main body has a cab. The bucket position detector detects a position of the bucket. The display device is provided in the cab and configured to overlay and thus display work assistance information on an actual view of a work site. The display controller is configured to change displaying of the work assistance information on the display device based on a distance between the position of the bucket detected by the bucket position detector and design topography.

14 Claims, 6 Drawing Sheets

(56) References Cited

U.S. PATENT DOCUMENTS

| | | | |
|---|---|---|---|
| 2013/0255977 A1* | 10/2013 | Braunstein | E02F 3/764 |
| | | | 172/4.5 |
| 2014/0257645 A1 | 9/2014 | Date | |
| 2014/0330508 A1 | 11/2014 | Montgomery | |
| 2016/0010312 A1 | 1/2016 | Kurihara et al. | |
| 2016/0024757 A1 | 1/2016 | Nomura et al. | |
| 2016/0186410 A1 | 6/2016 | Shioji et al. | |
| 2016/0193920 A1 | 7/2016 | Tsubone et al. | |

FOREIGN PATENT DOCUMENTS

| | | |
|---|---|---|
| CN | 104246085 A | 12/2014 |
| CN | 104781478 A | 7/2015 |
| CN | 104884713 A | 9/2015 |
| JP | H01-312129 A | 12/1989 |
| JP | 2000-291048 A | 10/2000 |
| JP | 2001-032331 A | 2/2001 |
| JP | 2004-68433 A | 3/2004 |
| JP | 2005-082961 A | 3/2005 |
| JP | 2005-307483 A | 11/2005 |
| JP | 2009-243073 A | 10/2009 |
| JP | 2012-233404 A | 11/2012 |
| JP | 2013-104236 A | 5/2013 |
| JP | 2013-113044 A | 6/2013 |
| JP | 2014-101664 A | 6/2014 |
| JP | 2014-129676 A | 7/2014 |
| JP | 2014-205955 A | 10/2014 |
| KR | 10-2015-0039856 A | 4/2015 |

* cited by examiner

WORK VEHICLE AND METHOD FOR CONTROLLING WORK VEHICLE

TECHNICAL FIELD

The present invention relates to a work vehicle and a method for controlling the work vehicle, and more specifically to a work vehicle having a bucket and a method for controlling displaying an image in the work vehicle.

BACKGROUND ART

Conventionally, a work vehicle such as a hydraulic excavator has been known. Such a work vehicle has a main body and a work implement connected to the main body. For example, a work implement of a hydraulic excavator has a boom, a dipper stick, and a bucket in the stated order as seen on the side of the main body.

Japanese Patent Laying-Open No. 2009-243073 (Patent Document 1) discloses a hydraulic excavator as a work vehicle. The hydraulic excavator includes a cab, a work implement, a display device, and a display position controller. The work implement is operated as manipulated by an operator in the cab. The display device is provided in the cab and displays a predetermined image.

CITATION LIST

Patent Document

PTD 1: Japanese Patent Laying-Open No. 2009-243073

SUMMARY OF INVENTION

Technical Problem

A display device provided on a front surface of a cab is a transmission-type display device and is provided so that the operator in the cab can see the work implement.

Accordingly, in order to appropriately obtain necessary information from a predetermined image displayed on the display device while efficiently manipulating the visually observed work implement, it is necessary to present appropriate information in accordance with a working condition.

The present invention has been made in view of the above, and an object of the present invention is to provide a work vehicle which can achieve further increased working efficiency, and a method for controlling the work vehicle.

Solution to Problem

A work vehicle according to one aspect comprises a work implement, a main body, a bucket position detector, a display device, and a display controller. The work implement has a bucket. To the main body, the work implement is attached, and the main body has a cab. The bucket position detector detects a position of the bucket. The display device is provided in the cab and configured to overlay and thus display work assistance information on an actual view of a work site. The display controller is configured to change displaying of the work assistance information on the display device based on a distance between the position of the bucket detected by the bucket position detector and design topography.

The operator working while visually observing the bucket can obtain appropriate work assistance information corresponding to a working condition, based on a distance between a position of the bucket and design topography, which can contribute further increased working efficiency.

Preferably, the display controller changes displaying of the work assistance information on the display device when the distance between the position of the bucket and the design topography falls within a predetermined value.

The operator working while visually observing the bucket can recognize that there is a small distance to the design topography and the operator can be urged to perform an excavating work with high precision, which can contribute further increased working efficiency.

Preferably, the display controller further includes a following process unit configured to display the work assistance information such that the work assistance information moves following the movement of the bucket. When the distance between the position of the bucket and the design topography falls within the predetermined value, the display controller increases in number the work assistance information displayed on the display device.

Moving the work assistance information to follow the movement of the bucket visually observed by the operator can contribute to a reduced movement of the operator's eyes and hence further increased working efficiency. Furthermore, when the distance between the position of the bucket and the design topography falls within the predetermined value, more work assistance information is displayed and accordingly, an increased amount of information is obtained, which can contribute further increased working efficiency.

Preferably, the display controller causes the display device to display the work assistance information on at least one of right and left sides of the bucket as seen from an operator in the cab.

Disposing the information on the right or left side of the bucket visually observed by the operator can contribute to a reduced movement of the operator's eyes and hence further increased working efficiency.

According to one aspect, a method for controlling a work vehicle comprising: a work implement having a bucket; and a display device provided in a cab and configured to overlay and thus display work assistance information on an actual view of a work site, comprises the steps of: detecting a position of the bucket; and changing displaying of the work assistance information on the display device based on a distance between the position of the bucket detected and design topography.

The operator working while visually observing the bucket can obtain appropriate work assistance information corresponding to a working condition, based on a distance between a position of the bucket and design topography, which can contribute further increased working efficiency.

Advantageous Effects of Invention

The present work vehicle and method for controlling the same can achieve further increased working efficiency.

DESCRIPTION OF EMBODIMENTS

The present invention will now be described in an embodiment hereinafter with reference to the drawings. In the following description, identical components are identically denoted. Their names and functions are also identical. Accordingly they will not be described repeatedly in detail. In the following description, "upper," "lower," "front," "rear," "right," and "left" are terms with reference to an operator seated on an operator's seat.

<A. General Configuration>

Figure 1:
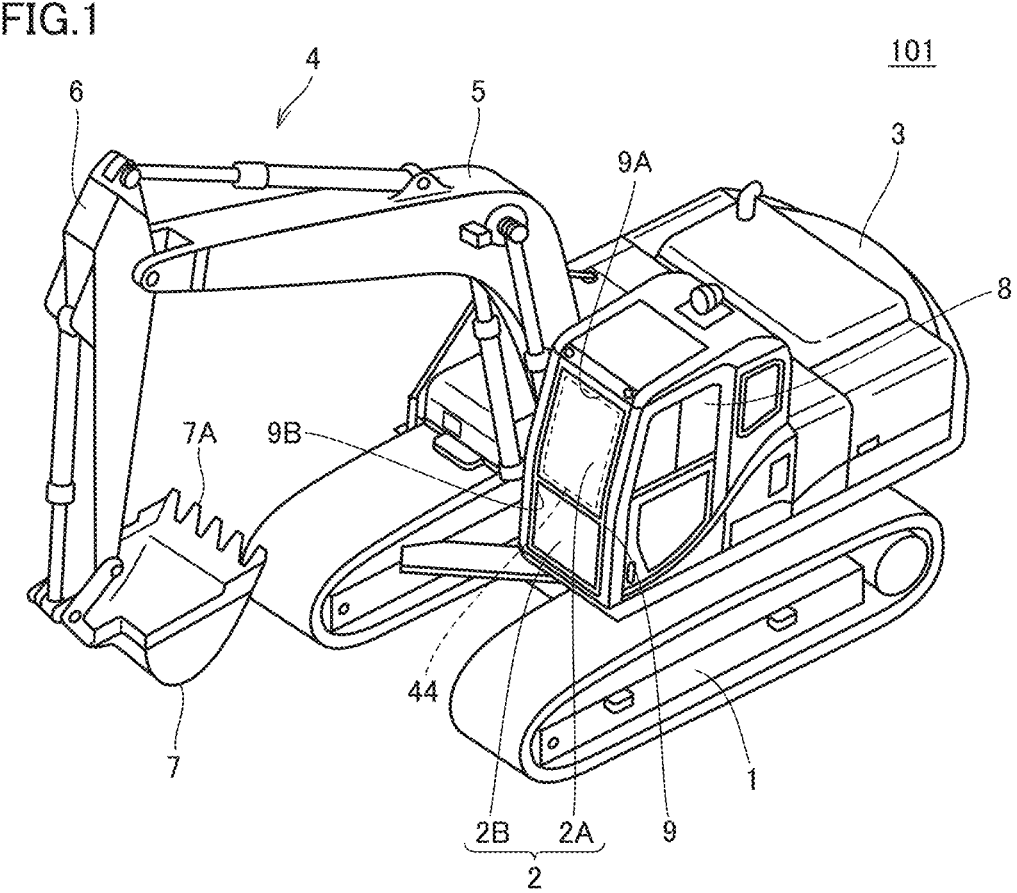
FIG. 1 is a diagram for illustrating an appearance of a work vehicle 101 according to an embodiment.

FIG. 1 is a diagram for illustrating an appearance of a work vehicle 101 according to an embodiment.

As shown in FIG. 1, a hydraulic excavator will be described as an example of work vehicle 101 according to the embodiment.

Work vehicle 101 mainly includes a travel unit 1, a revolving unit 3, and a work implement 4.

Work vehicle 101 has a main body composed of travel unit 1 and revolving unit 3. The main body has work implement 4 attached thereto. Travel unit 1 has a pair of right and left crawler belts. Revolving unit 3 is mounted via a revolving mechanism of travel unit 1 revolvably. Revolving unit 3 has a cab 8 and the like.

Work implement 4 is pivotally supported at revolving unit 3 so as to be movable upward and downward and performs a work such as excavation of soil. Work implement 4 includes a boom 5, a dipper stick 6, and a bucket 7. Work implement 4 is provided at a position visually observable on a right and front side as seen from cab 8.

Boom 5 has a base movably coupled to revolving unit 3. Dipper stick 6 is movably coupled to the distal end of boom 5. Bucket 7 is movably coupled to the distal end of dipper stick 6. Bucket 7 is movable upward and downward relative to cab 8. Further, bucket 7 is also movable frontward and rearward relative to cab 8. Bucket 7 has teeth 7A.

Cab 8 has a front windshield 2. Front windshield 2 is fixed by a frame 9. Front windshield 2 is composed of a front windshield 2A and a front windshield 2B located below front windshield 2A. Front windshield 2A is provided inside an opening frame 9A (inside an opening frame), and front windshield 2B is provided inside a lower opening frame 9B. Front windshields 2A and 2B are separately provided to match how frame 9 in front of cab 8 is bent. Front windshields 2A and 2B thus separated ensure that the operator can have a wide field of view and the frame and the like can also be strong.

Display device 44 is attached in front of an operator's seat in cab 8 of work vehicle 101. In the present embodiment, display device 44 is composed of a member (a film or the like) which transmits external light incident on cab 8, and a projection device (projector). The projection device projects an image which is in turn displayed as a real image on the member (such as a film) that transmits external light. Display device 44 has a display area provided inside opening frame 9A provided on a front surface of cab 8 of work vehicle 101. The operator in cab 8 can visually observe an actual view of a work site including work implement 4 through the display area of display device 44. Display device 44 overlays on the actual view of the work site and thus display information for assisting the operator to manipulate work implement 4 (hereinafter also referred to as a work) (hereinafter also referred to as work assistance information). Display device 44 functions as a head-up display that directly displays an image in the field of view of the operator.

The member that transmits external light, such as a film, of display device 44 is placed on front windshield 2A. Display device 44 has a display extending to reach an edge of front windshield 2A. Front windshield 2A may be the same as or different from the display area of display device 44 in size.

While in the present embodiment, as display device 44, a configuration will be described in which an image projected by a projection device (projector) is displayed on a member (such as a film) that transmits external light incident on cab 8, this is not exclusive, and it is also possible to have a configuration including display device 44 which is a transparent display (for example, a transmission type liquid crystal display).

<B. Configuration of Control System>

Figure 2:
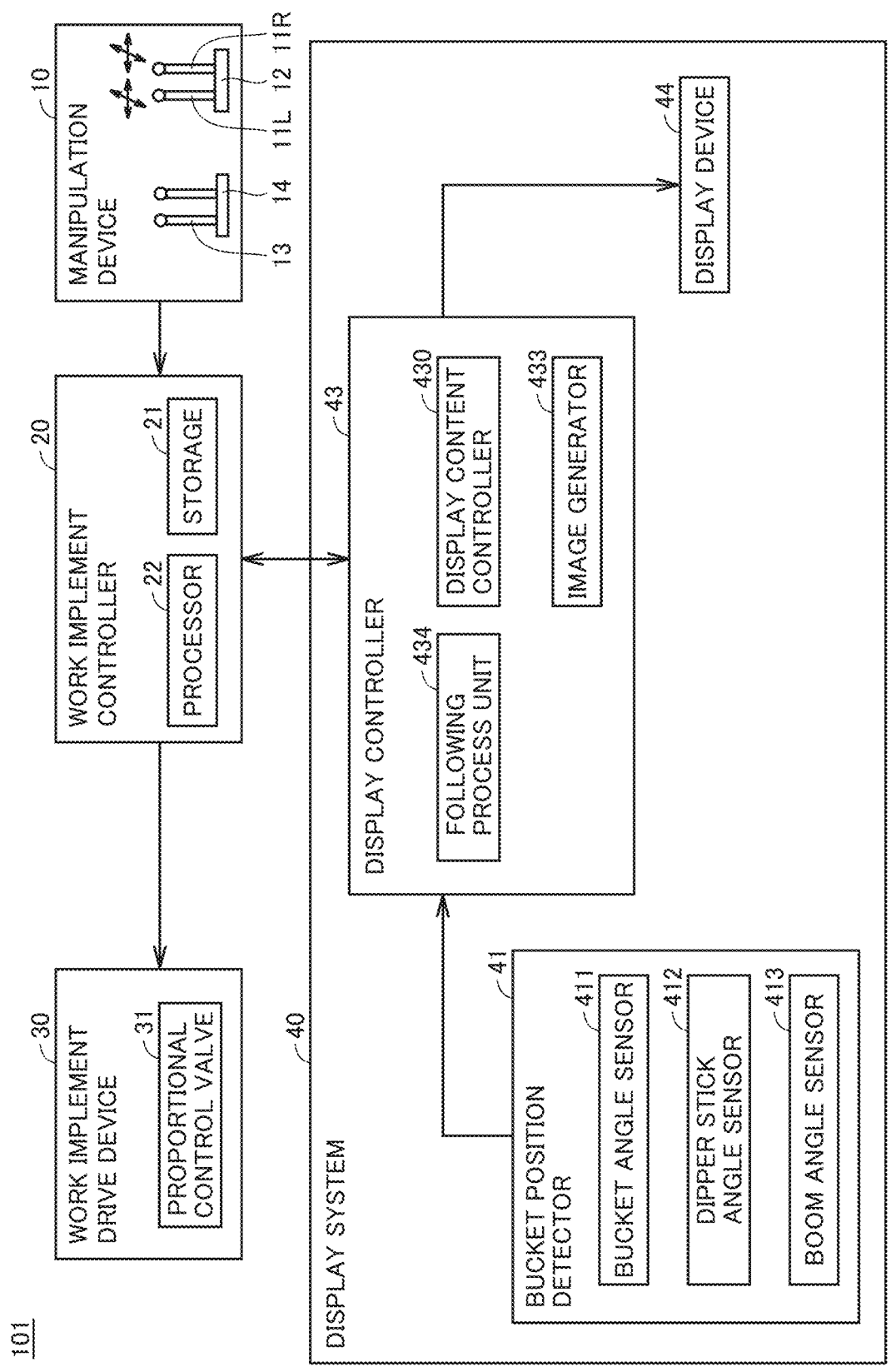
FIG. 2 is a block diagram representing a configuration of a control system included in work vehicle 101 according to an embodiment.

FIG. 2 is a block diagram representing a configuration of a control system included in work vehicle 101 according to an embodiment.

As shown in FIG. 2, work vehicle 101 includes a manipulation device 10, a work implement controller 20, a work implement drive device 30, and a display system 40.

(b1. Manipulation Device 10)

Manipulation device 10 includes manipulation members 11L and 11R, a manipulation detector 12, a travel manipulation member 13, and a travel manipulation detector 14.

Manipulation members 11L and 11R are used by the operator to manipulate work implement 4 and revolving unit 3. Manipulation member 11R is used by the operator to manipulate boom 5 and bucket 7. Manipulation member 11L is used by the operator to manipulate revolving unit 3 and dipper stick 6.

Manipulation detector 12 detects a manipulation done by the operator to manipulation member 11L. Manipulation detector 12R detects a manipulation done by the operator to manipulation member 11R.

Travel manipulation member 13 is used by the operator to control traveling of work vehicle 101. Travel manipulation detector 14 detects a pilot flow rate according to content of control done via travel manipulation member 13. Work vehicle 101 moves at a speed corresponding to the pilot flow rate.

(b2. Work Implement Controller 20)

Work implement controller 20 includes a storage 21 and a processor 22. Storage 21 is composed of memory such as RAM (Random Access Memory) and ROM (Read Only Memory). Processor 22 is composed of a processing device such as a CPU (Central Processing Unit).

Work implement controller 20 mainly controls the operation of work implement 4 and the revolution of revolving unit 3. Work implement controller 20 generates a control signal for operating work implement 4 and revolving unit 3 in response to a manipulation done to manipulation members 11L and 11R. Work implement controller 20 outputs the generated control signal to work implement drive device 30.

(b3. Work Implement Drive Device 30)

Work implement drive device 30 has a proportional control valve 31. Proportional control valve 31 operates based on a control signal issued from work implement controller 20. Proportional control valve 31 supplies a hydraulic cylinder and a revolution motor with hydraulic oil at a flow rate corresponding to the control signal. As a result, work implement 4 operates and revolving unit 3 revolves.

(b4. Display System 40)

Display device 44 of display system 40 displays various types of images such as work assistance information.

Display system 40 includes a bucket position detector 41, a display controller 43, and display device 44. In display system 40, a predetermined reference position is preset as a viewpoint position for the operator.

Bucket position detector 41 includes a bucket angle sensor 411, a dipper stick angle sensor 412, and a boom angle sensor 413.

Bucket angle sensor 411 detects a relative angle of bucket 7 from a predetermined reference position. Dipper stick angle sensor 412 detects a relative angle of dipper stick 6 from a predetermined reference position. Boom angle sensor 413 detects a relative angle of boom 5 from a predetermined reference position.

Bucket position detector 41 detects a position of bucket 7 with respect to the body of the work vehicle based on information of the three relative angles as detected. And a position of bucket 7 in the vehicular body's coordinate system is detected. Bucket position detector 41 detects the position of teeth 7A of bucket 7, for example, as the position of bucket 7.

Display controller 43 includes a display content controller 430, a following process unit 434, and an image generator 433.

Display controller 43 causes display device 44 to display the work assistance information based on the position of bucket 7 as detected.

Image generator 433 generates an image to be displayed on display device 44. Image generator 433 generates an image representing a vehicular speedometer, an engine revolution indicator, a fuel indicator, a hydraulic temperature indicator, and the like. Further, image generator 433 generates an image representing work assistance information.

Image generator 433 is connected to a controller (not shown) that controls a power system of work vehicle 101. Image generator 433 receives information sensed by various sensors, information of content of control done by the controller, and the like. Based on the received information, image generator 433 generates an image which display device 44 is caused to display.

Display content controller 430 computes a display position on display device 44 for an image and causes display device 44 to display the image at the calculated display position. Display content controller 430 calculates a display position on display device 44 for work assistance information and causes display device 44 to display the work assistance information at the calculated position. Furthermore, display content controller 430 changes displaying of the work assistance information depending on the working condition.

Following process unit 434 performs a process to move and thus display at least one piece of work assistance information composing work assistance information displayed by display device 44 such that the information follows the movement of bucket 7.

Each function block of display controller 43 is implemented by a processing device such as a CPU, a storage device such as RAM and ROM, and the like.

<C. Method for Displaying Work Assistance Information>

Figure 3:
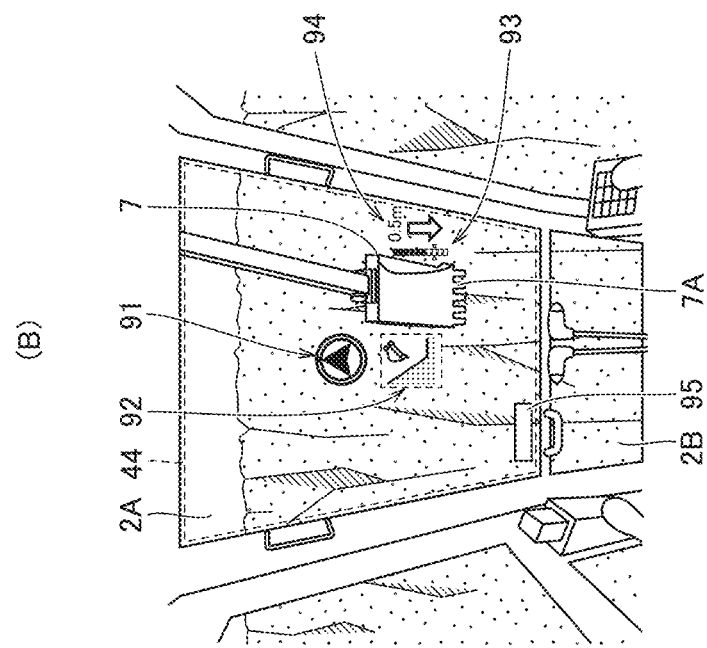
FIG. 3 is a diagram showing contents of work assistance information displayed by a display device 44 according to an embodiment.
Figure 3:
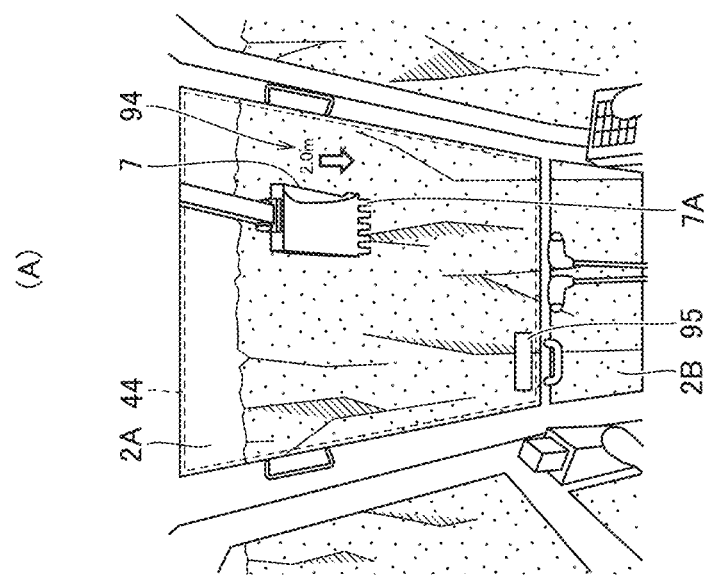

FIG. 3 is a diagram showing contents of work assistance information displayed by display device 44 according to an embodiment.

FIG. 3(A) shows work assistance information when rough excavation is performed. Display content controller 430 causes display device 44 to display work assistance information on a display area of display device 44. Specifically, two pieces of work assistance information 94, 95 are displayed.

Work assistance information 94 represents a direction of design topography, and a distance between the design topography and teeth 7A. In FIG. 3(A), a distance of 2.0 m is indicated between the design topography and teeth 7A.

In the present example, when the distance between the design topography and teeth 7A is equal to or smaller than a predetermined value (or 1.0 m), it is determined that finishing excavation is performed, whereas when the distance between the design topography and teeth 7A exceeds the predetermined value (or 1.0 m), it is determined that rough excavation is performed.

When rough excavation is performed, there is a large distance between teeth 7A of bucket 7 and the design topography, and accordingly, work assistance information 94 is displayed as information necessary for performing the excavating work.

Work assistance information 95 is a bar showing a state of a progress of a work in the entire working process, and may not be displayed.

FIG. 3(B) shows work assistance information when finishing excavation is performed. Display content controller 430 causes display device 44 to display work assistance information on a display area of display device 44. Specifically, five pieces of work assistance information 91 to 95 are displayed.

Based on the distance between teeth 7A of bucket 7 and the design topography, display content controller 430 determines whether the current working condition is rough excavation or finishing excavation. More specifically, if the distance exceeds the predetermined value, it is determined that rough excavation is currently performed, whereas if it does not, it is determined that finishing excavation is currently performed.

Based on the determination result, display content controller 430 displays work assistance information corresponding to the working condition.

At the time of finishing excavation, teeth 7A of bucket 7 has a small distance to the design topography and various information is required to perform an excavating work with high precision, and accordingly, more work assistance information is displayed than when rough excavation is performed.

Specifically, display content controller 430 causes the display device to display each of work assistance information 91 to 94 around bucket 7. Display content controller 430 may display work assistance information 91 to 94 at a position higher than teeth 7A of bucket 7.

Furthermore, in the example of FIG. 3(B), display content controller 430 controls a display position on display device 44 for work assistance information 91, 92 to allow work assistance information 91, 92 to be visually observed at a position on a left side of bucket 7 as seen from cab 8. Furthermore, display content controller 430 controls a display position on display device 44 for work assistance information 93, 94 to allow work assistance information 93, 94 to be visually observed at a position on a right side of bucket 7 as seen from cab 8.

Work assistance information 91 represents a facing angle compass. The facing angle compass indicates whether work vehicle 101 is in a state in which work vehicle 101 directly faces design topography data. Furthermore, when work vehicle 101 is not in the directly facing state, the facing angle compass represents an amount of displacement by a rotation angle of an arrow indicated inside a circle. When the work vehicle is not directly facing the design topography data, display controller 43 may cause display device 44 to display work assistance information 91 in a manner different from that shown in FIG. 3, such as by changing a color used to display the facing angle compass.

Work assistance information 92 represents the design topography and the teeth in a cross section (a lateral cross section). Work assistance information 93 represents a bar indicator. The bar indicator is displayed when finishing excavation is performed. Graphically displaying a distance between the design topography and teeth 7A, such as the bar indicator, can enhance the operator's recognition of information. Work assistance information 94 represents a direction of the design topography, and a distance of 0.5 m between the design topography and teeth 7A.

As has been discussed above, display content controller 430 determines, based on the distance between teeth 7A of bucket 7 and the design topography, whether a working condition is rough excavation or finishing excavation, and based on the result of the determination, display content controller 430 causes the display device to display work assistance information corresponding to the working condition.

Work assistance information 95 is a bar showing a state of a progress of a work in the entire working process.

As has been described with reference to FIG. 3(A), at the time of rough excavation, the work assistance information corresponding to the working condition (i.e., work assistance information 94) is displayed around bucket 7, which ensures that the operator has a satisfactory field of view around bucket 7.

As has been described with reference to FIG. 3(B), at the time of finishing excavation, the work assistance information corresponding to the working condition (i.e., work assistance information 91 to 94) is displayed around bucket 7, which allows further increased working efficiency.

The operator working while visually observing the bucket can obtain appropriate work assistance information corresponding to a working condition, based on a distance between a position of the bucket and design topography, and thus work further more efficiently.

It should be noted that while display device 44 shown in FIG. 3 displays work assistance information 91 to 95, the work assistance information displayed by display device 44 is not limited thereto.

While in the present example a case has been described in which two pieces of work assistance information are displayed for rough excavation and five pieces of work assistance information are displayed for finishing excavation, this is not exclusive, and no such information may be displayed for rough excavation and at least one piece of work assistance information may be displayed for finishing excavation.

Further, as shown in FIG. 3(B), display content controller 430 causes the display device to display work assistance information 91 to 94 such that the information moves following the movement of bucket 7.

Figure 4:
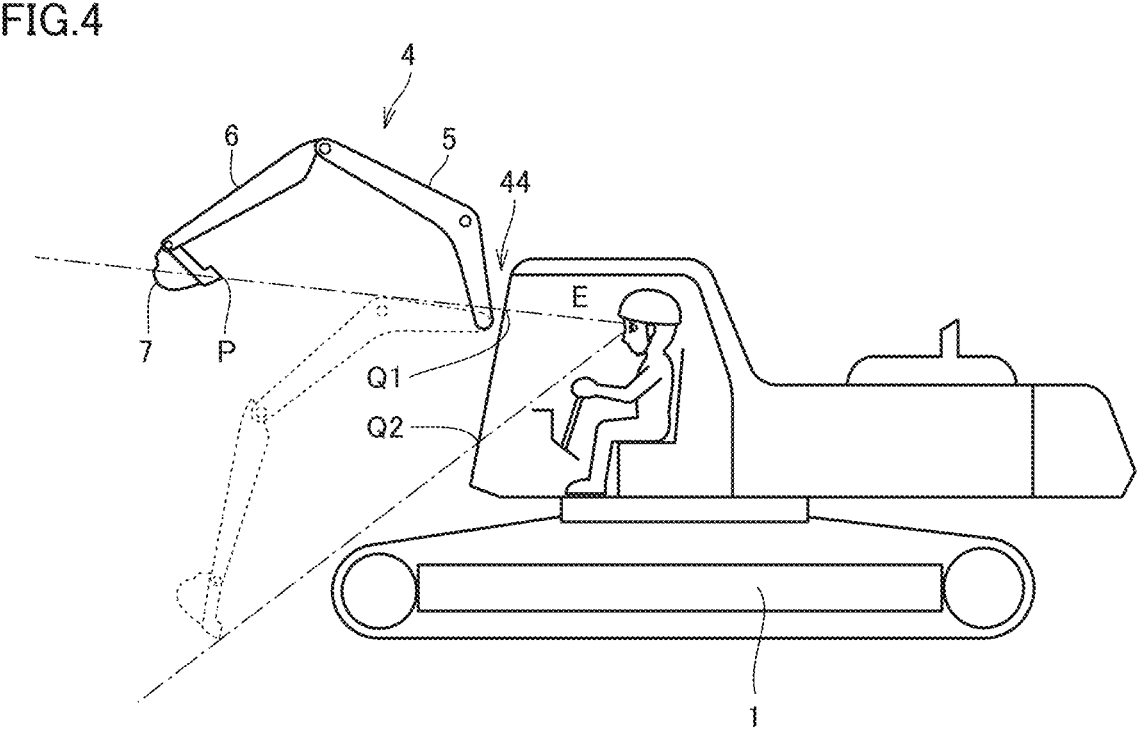
FIG. 4 is a diagram for illustrating a method for calculating the position of the teeth of a bucket 7 on display device 44.

FIG. 4 is a diagram for illustrating a method for calculating the position of the teeth of bucket 7 on display device 44.

FIG. 4 shows the operator's viewpoint position (or reference position) E. Bucket position detector 41 detects a position P of teeth 7A of bucket 7 on the vehicular body's coordinate system. Display content controller 430 calculates a position at which position P of teeth 7A of bucket 7 as detected and the operator's viewpoint position E intersect as a position Q of the teeth of bucket 7 on display device 44. FIG. 4 shows a case where positions Q1, Q2 of the teeth of bucket 7 are calculated depending on the state of work implement 4.

Following process unit 434 performs a process to display work assistance information 91 to 94 to follow the movement of bucket 7. Specifically, when bucket 7 moves, following process unit 434 performs a process for causing a display position on display device 44 for work assistance information 91 to 94 to follow the movement of bucket 7, based on a position of the teeth of bucket 7 successively calculated. Following process unit 434 causes the display position for work assistance information 91 to 94 to follow the movement of bucket 7 so that the information has a fixed relative positional relationship with bucket 7. By this display method, work assistance information 91 to 94 is disposed to follow bucket 7 visually observed by the operator. This can contribute to a reduced movement of the operator's eyes and hence further increased working efficiency.

<D. Control Flow>

Figure 5:
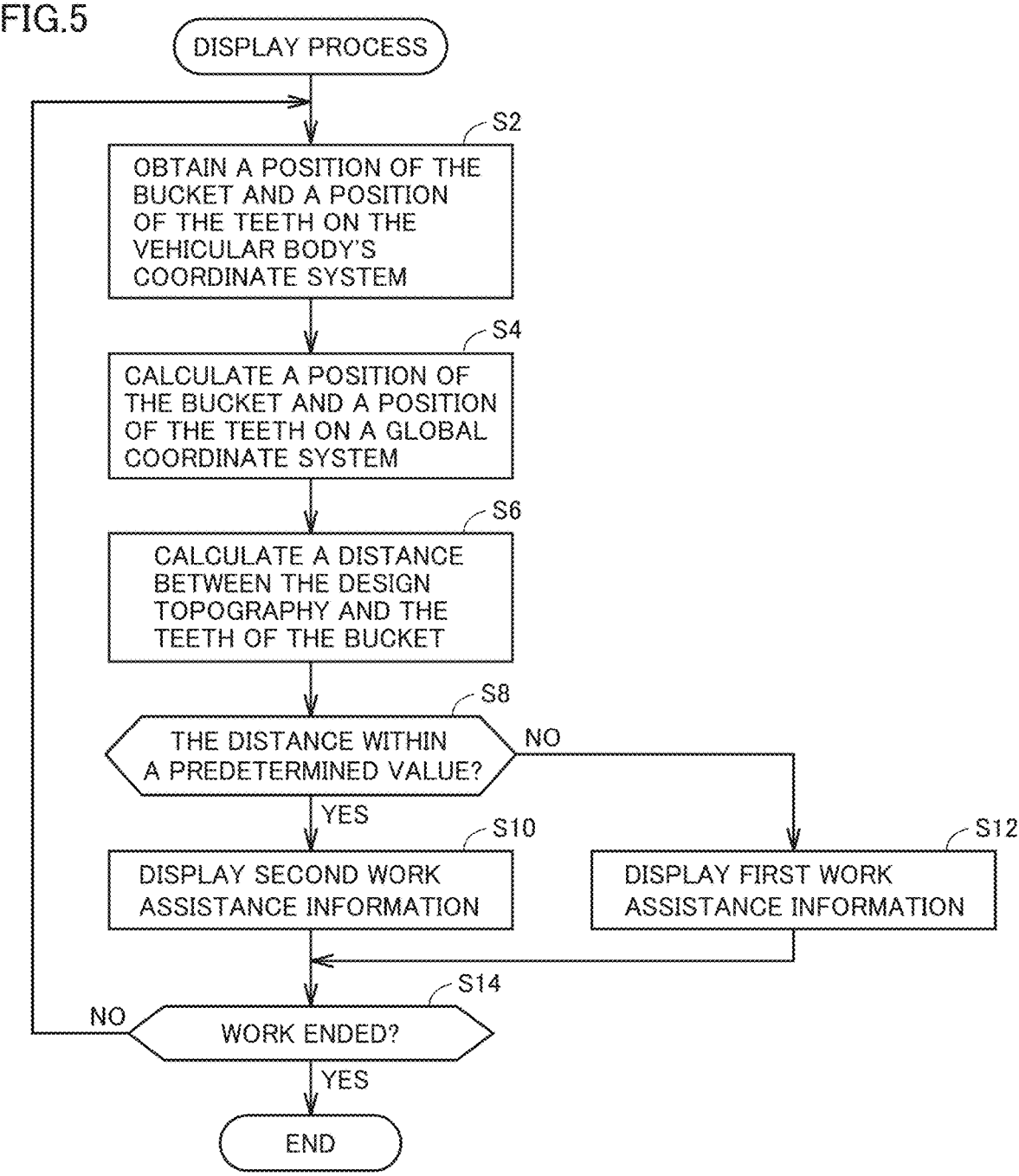
FIG. 5 is a flowchart for illustrating a process of displaying work assistance information according to an embodiment.

FIG. 5 is a flowchart for illustrating a process of displaying work assistance information according to an embodiment.

As shown in FIG. 5, display controller 43 obtains a position of bucket 7 and a position of teeth 7A on the vehicular body's coordinate system (step S2). Specifically, display content controller 430 obtains a position of bucket 7 and a position of teeth 7A on the vehicular body's coordinate system in accordance with a result of detection by bucket position detector 41.

Subsequently, display controller 43 calculates a position of bucket 7 and a position of teeth 7A on a global coordinate system (step S4). Specifically, display content controller 430 calculates a position of bucket 7 and a position of teeth 7A on the global coordinate system based on information received from a variety of types of sensors.

Subsequently, display controller 43 calculates a distance between the design topography and teeth 7A of bucket 7 (step S6). More specifically, display content controller 430 calculates the distance based on previously provided data about the design topography and the position of teeth 7A of bucket 7 as calculated.

Subsequently, display controller 43 determines whether the distance between the design topography and teeth 7A of bucket 7 falls within a predetermined value (step S8). Specifically, display content controller 430 determines whether the distance between the previously provided data about the design topography and teeth 7A of bucket 7 calculated falls within the predetermined value. The predetermined value may be set in advance or may be changeable by the operator. The predetermined value is set to be an appropriate value so that a working condition falling within the predetermined value is determined to be finishing excavation and a working condition departing from the predetermined value is determined to be rough excavation.

In step S8, when display controller 43 determines that the distance between the design topography and teeth 7A of bucket 7 does not fall within the predetermined value (NO in step S8), display controller 43 causes the display device to display first work assistance information (step S12). Specifically, when display content controller 430 determines that the distance between the design topography and teeth 7A of bucket 7 does not fall within the predetermined value, display content controller 430 determines that the current excavation is rough excavation, and causes display device 44 to display work assistance information 94, 95 described with reference to FIG. 3(A).

In step S8, when display controller 43 determines that the distance between the design topography and the position of teeth 7A of bucket 7 falls within the predetermined value (YES in step S8), display controller 43 causes the display device to display second work assistance information (step S10). Specifically, when display content controller 430 determines that the distance between the design topography and teeth 7A of bucket 7 falls within the predetermined value, display content controller 430 determines that the current excavation is finishing excavation, and causes display device 44 to display work assistance information 91 to 95 described with reference to FIG. 3(B).

Subsequently, display controller 43 determines whether the work has ended (step S14).

In step S14, if display controller 43 determines that the work has ended (YES in step S14), display controller 43 ends the display process (END). For example, it is determined that the work has ended when it is detected that the operator has performed an operation to stop the engine.

On the other hand, if it is determined in step S14 that the work has not ended (NO in step S14), display controller 43 returns to step S2 and repeats the above process.

While in this example is described a method in which at step S8 whether a distance between design topography and teeth 7A of bucket 7 falls within a predetermined value is determined, the method is one example, and in this regard it is possible to adopt a method in which whether the distance between the design topography and teeth 7A of bucket 7 has the predetermined value and whether the distance between the design topography and teeth 7A of bucket 7 is smaller than the predetermined value are determined as different processes. Furthermore, it is also possible to change to a method in which display controller 43 determines whether the distance between the design topography and teeth 7A of bucket 7 is smaller than the predetermined value.

<E. Modification>

(e1. First Modification)

Work vehicle 101 may include a display device having a configuration different from that of display device 44. Specifically, work vehicle 101 may include a combiner as a display device.

Figure 6:
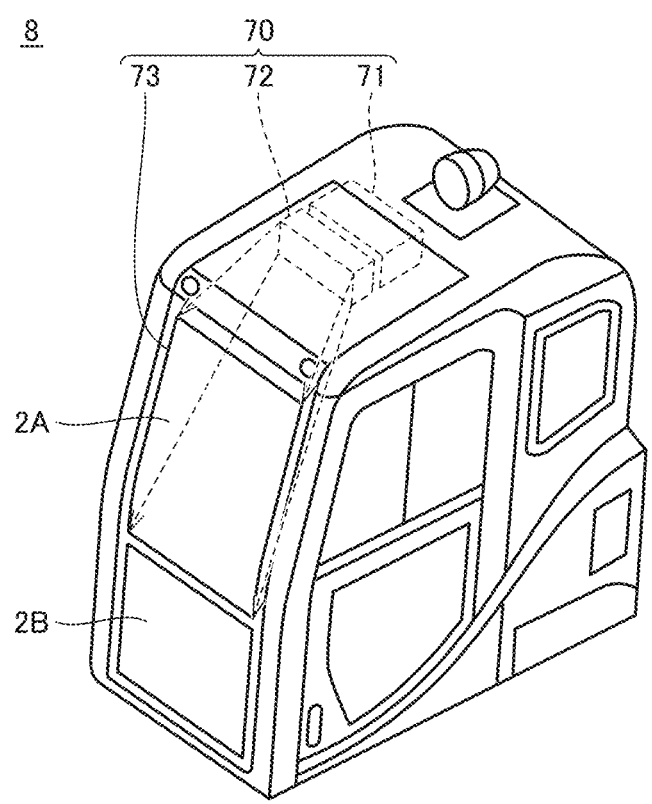
FIG. 6 is a diagram showing another display device having a configuration different from that of display device 44 according to an embodiment.

FIG. 6 is a diagram showing another display device having a configuration different from that of display device 44 according to an embodiment.

As shown in FIG. 6, a display device 70 is provided in cab 8, and has a projection device 71, an optical lens system 72, and a combiner 73.

Projection device 71 is a projector. Optical lens system 72 is disposed between projection device 71 and combiner 73. Optical lens system 72 has a plurality of lenses. Optical lens system 72 has the plurality of lenses with some thereof movable along the optical axis.

Combiner 73 is disposed at front windshield 2A. Combiner 73 may be disposed at front windshield 2A and front windshield 2B. Combiner 73 is composed of a half mirror which reflects a part of light and transmits a remainder thereof combiner 73 reflects an image projected by projection device 71 to the side of the operator in cab 8 and transmits light from the outside of cab 8 to the interior of cab 8.

Thus, display device 70 allows the operator to recognize the image projected on combiner 73 as a virtual image overlaid and thus displayed on an actual view in front of cab 8.

Thus a work vehicle comprising display device 70 using combiner 73 can also achieve an effect similar to that of work vehicle 101 of an embodiment.

(e2. Second Modification)

While in the above description a configuration in which display device 44 displays in a display area inside opening frame 9A has been described as an example, the present invention is not limited thereto. Display device 44 may also display an inside of opening frame 9B as a display area. That is, cab 8 may be configured to include a transparent dual display. In that case, display controller 43 will control displaying in two display areas. It is also possible to provide another display device for the display area of opening frame 9B.

A work vehicle having such a configuration can also achieve an effect similar to that obtained by work vehicle 101 described above. Note that in the above case, the work assistance information can also be displayed in a display area of the lower display device. When bucket 7 moves in a downward direction, display controller 43 can cause the work assistance information to follow bucket 7 to a position lower than in the case shown in FIG. 3 and the like.

(e3. Third Modification)

While in the configuration described above a configuration in which the work assistance information has content changed based on whether a distance between design topography and teeth 7A of bucket 7 falls within a predetermined value has been described, this is not exclusive, and the work assistance information may have content changed based on other conditions. Specifically, the work assistance information may have content changed depending on the type of work, such as a flat land operation, a dredging operation, a slope shaping operation. Whether a work is a flat land operation, a dredging operation or a slope shaping operation may be determined based on design topography or may be determined based on construction plan data.

While a hydraulic excavator has been described as the above work vehicle, the work vehicle is also applicable to a backhoe loader and other work vehicles.

It should be understood that the embodiments disclosed herein are illustrative and not limited to the above disclosure. The scope of the present invention is defined by the terms of the claims, and is intended to include any modifications within the meaning and scope equivalent to the terms of the claims.

REFERENCE SIGNS LIST

1: travel unit; 2: front windshield; 2A: front windshield; 2B: front windshield; 3: revolving unit; 4: work implement; 5: boom; 6: dipper stick; 7: bucket; 7A: teeth; 8: cab; 9: frame; 9A, 9B: opening frame; 10: manipulation device; 11L, 11R: manipulation member; 12: manipulation detector; 13: travel manipulation member; 14: travel manipulation detector; 20: work implement controller; 21: storage; 22: processor; 30: work implement drive device; 31: proportional control valve; 40: display system; 41: bucket position detector; 42: viewpoint position setter; 43: display controller; 44, 70: display device; 71: projection device; 72: optical lens system; 73: combiner; 91, 92, 93, 94, 95: work assistance information; 101: work vehicle; 411: bucket angle sensor; 412: dipper stick angle sensor; 413: boom angle sensor; 422: seat position sensor; 430: display content controller; 433: image generator; 434: following process unit.

The invention claimed is:

1. A work vehicle comprising:
   a work implement having a bucket;
   a main body to which the work implement is attached, and having a cab; and
   a bucket position detector configured to detect a position of the bucket;
   a display device provided in the cab and configured to overlay and display work assistance information on an actual view of a work site; and
   a display controller configured to cause the display device to display, on the actual view of the work site and adjacent to a right side and a left side of the bucket as seen from the cab, the overlaid work assistance information relevant to finishing excavation when a distance between the position of the bucket detected by the bucket position detector and design topography falls within a predetermined value, and display, on the actual view of the work site and adjacent to at least one of the right side and the left side of the bucket as seen from the cab, the overlaid work assistance information relevant to rough excavation when the distance does not fall within the predetermined value.

2. The work vehicle according to claim 1, wherein the display controller changes displaying of the overlaid work assistance information on the display device when the distance between the position of the bucket and the design topography falls within the predetermined value.

3. The work vehicle according to claim 1, wherein
   the display controller further includes a following process unit configured to display the overlaid work assistance information such that the overlaid work assistance information moves following movement of the bucket, and
   when the distance between the position of the bucket and the design topography falls within the predetermined value, the display controller increases in number the overlaid work assistance information displayed on the display device.

4. The work vehicle according to claim 1, wherein the display controller causes the display device to display the overlaid work assistance information relevant to the finishing excavation including at least one of i) a facing angle compass and ii) a lateral cross section on the left side of the bucket as seen the cab and display the overlaid work assistance information relevant to the finishing excavation including a bar indicator showing the distance between the position of the bucket and the design topography on the right side of the bucket as seen from the cab, and
   wherein the display controller causes the display device to display the overlaid work assistance information relevant to the rough excavation including at least one of i) a direction of the design topography and ii) the distance between the position of the bucket and the design topography on the right side of the bucket as seen from the cab.

5. The work vehicle according to claim 1, wherein the overlaid work assistance information relevant to the finishing excavation further includes a bar indicator indicating distance between the design topography and teeth of the bucket.

6. The work vehicle according to claim 1, wherein the overlaid work assistance information relevant to the rough excavation includes at least one of a distance between the design topography and teeth of the bucket and a bar showing a state of a progress of a work.

7. The work vehicle according to claim 1, wherein the overlaid work assistance information relevant to the finishing excavation includes at least a facing angle compass and a lateral cross section.

8. The work vehicle according to claim 1, wherein the display controller causes the display device to display the overlaid work assistance information relevant to the finishing excavation including i) a facing angle compass and ii) a lateral cross section on the left side of the bucket as the cab and display the overlaid work assistance information relevant to the finishing excavation including i) a bar indicator showing the distance between the position of the bucket and the design topography, ii) a direction of the design topography, and iii) the distance between the position of the bucket and the design topography on the right side of the bucket as seen from the cab on the right side of the bucket as seen from the cab, and
   wherein the display controller causes the display device to display the overlaid work assistance information relevant to the rough excavation including i) the direction of the design topography and ii) the distance between the position of the bucket and the design topography on the right side of the bucket as seen from the cab.

9. A method for controlling a work vehicle comprising: a work implement having a bucket; and a display device provided in a cab and configured to overlay and display work assistance information on an actual view of a work site, the method comprising the steps of:
   detecting a position of the bucket; and
   displaying, on the actual view of the work site and adjacent to a right side and a left side of the bucket as seen from the cab, the overlaid work assistance information relevant to finishing excavation when a distance between the position of the bucket detected and design topography falls within a predetermined value, and displaying, on the actual view of the work site and adjacent to at least one of the right side and the left side of the bucket as seen from the cab, the overlaid work assistance information relevant to rough excavation when the distance does not fall within the predetermined value.

10. The method according to claim 9, wherein the overlaid work assistance information relevant to the finishing excavation further includes a bar indicator indicating distance between the design topography and teeth of the bucket.

11. The method according to claim 9, wherein the overlaid work assistance information relevant to the rough excavation includes at least one of a distance between the design topography and teeth of the bucket and a bar showing a state of a progress of a work.

12. The method according to claim 9, wherein the overlaid work assistance information relevant to the finishing excavation includes at least a facing angle compass and a lateral cross section.

13. The method according to claim 9, wherein displaying the overlaid work assistance information relevant to the finishing excavation includes displaying at least one of i) a facing angle compass and ii) a lateral cross section on the left side of the bucket as seen the cab and displaying a bar indicator showing the distance between the position of the bucket and the design topography on the right side of the bucket as seen from the cab, and
   wherein displaying the overlaid work assistance information relevant to the rough excavation including at least one of i) a direction of the design topography and ii) the distance between the position of the bucket and the design topography on the right side of the bucket as seen from the cab.

14. The method according to claim 9, wherein displaying the overlaid work assistance information relevant to the finishing excavation includes displaying i) a facing angle compass and ii) a lateral cross section on the left side of the bucket as seen the cab and displaying i) a bar indicator showing the distance between the position of the bucket and the design topography, ii) a direction of the design topography, and iii) the distance between the position of the bucket and the design topography on the right side of the bucket as seen from the cab, and wherein displaying the overlaid work assistance information relevant to the rough excavation including at least one of i) the direction of the design topography and ii) the distance between the position of the bucket and the design topography on the right side of the bucket as seen from the cab.

* * * * *